UNITED STATES PATENT OFFICE.

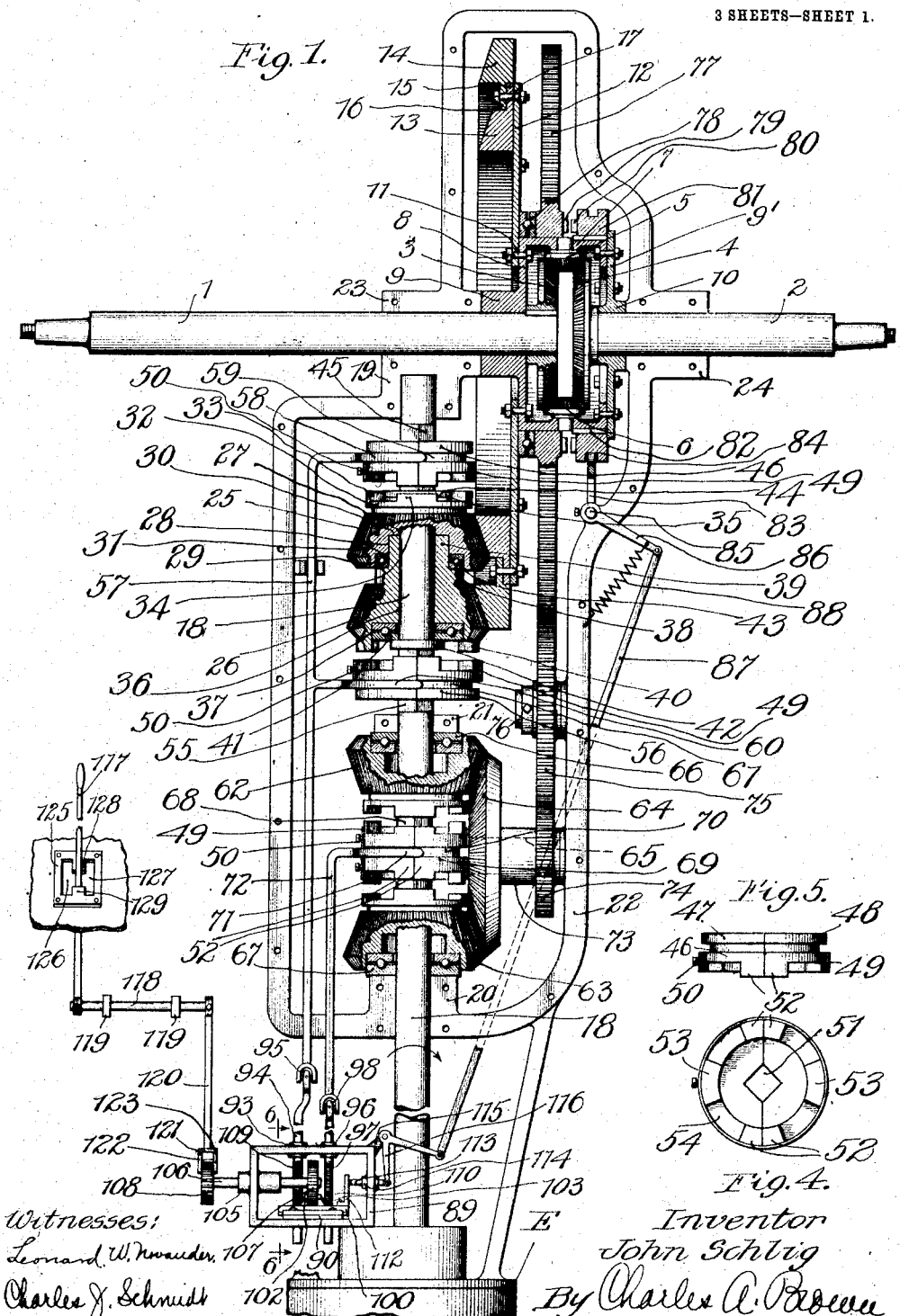

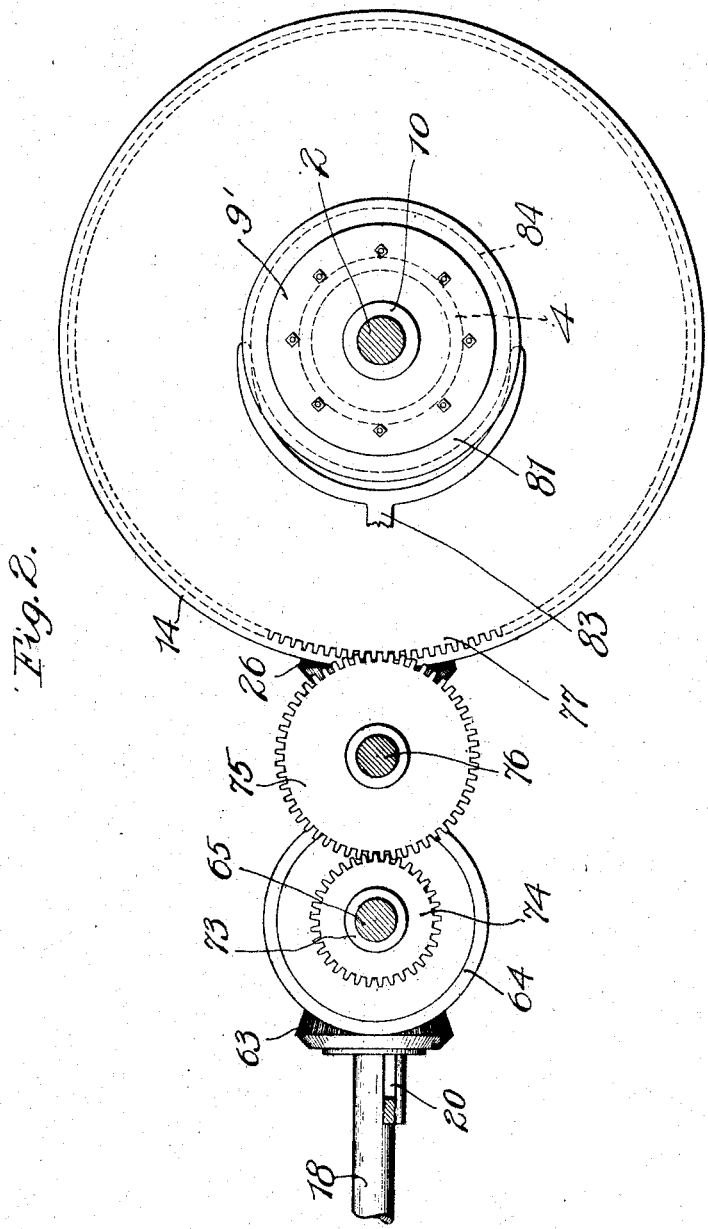

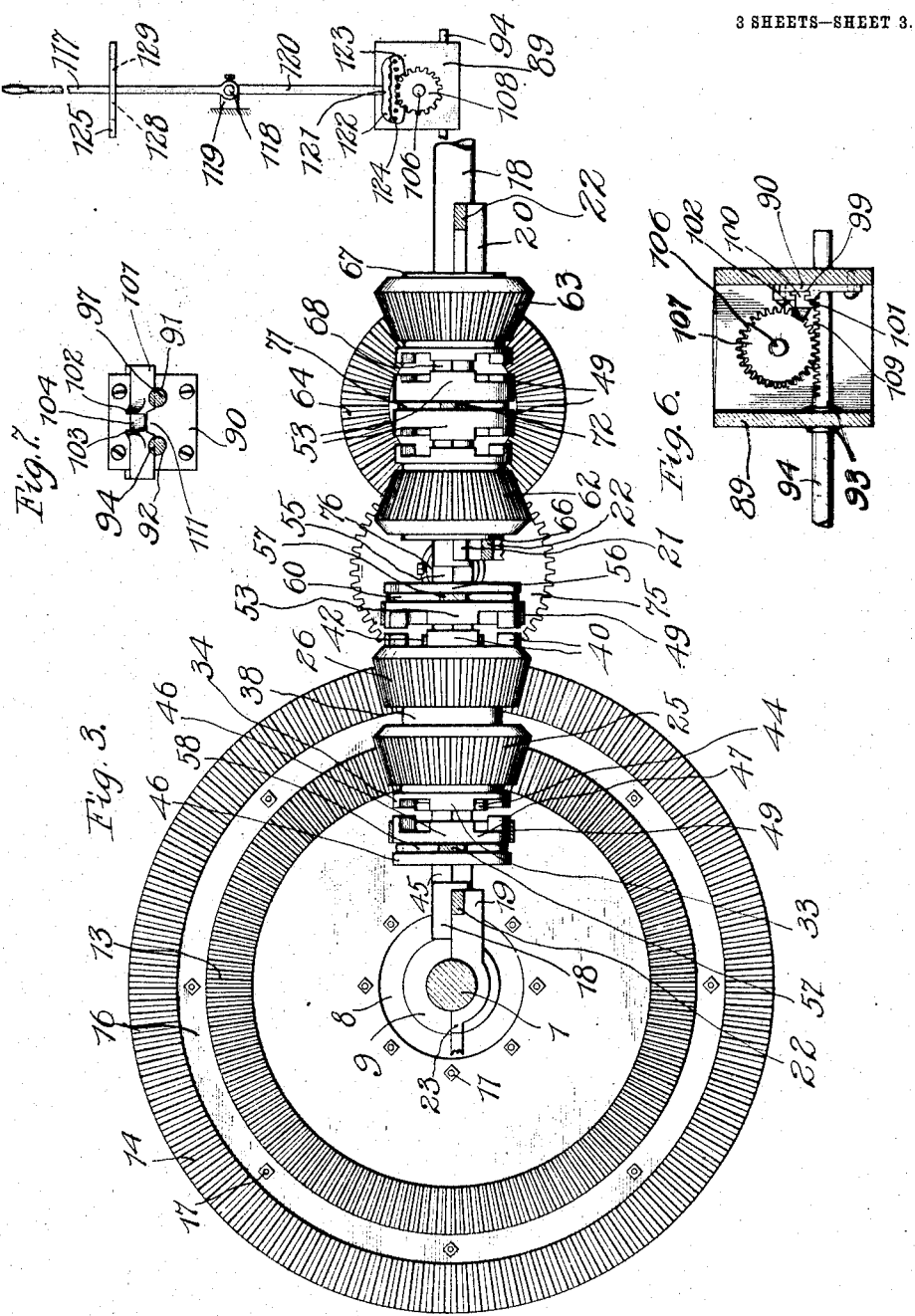

JOHN SCHLIG, OF CHICAGO, ILLINOIS, ASSIGNOR TO SCHLIG'S DIRECT DRIVE, OF CHICAGO ILLINOIS, A CORPORATION OF ILLINOIS.

TRANSMISSION SYSTEM.

No. 907,182.  Specification of Letters Patent.  Patented Dec. 22, 1908.

Application filed January 15, 1907. Serial No. 352,460.

*To all whom it may concern:*

Be it known that I, JOHN SCHLIG, citizen of the United States, residing at Chicago, in the county of Cook and State of Illinois, have invented a certain new and useful Improvement in Transmission Systems, of which the following is a full, clear, concise, and exact description, reference being had to the accompanying drawings, forming a part of this specification.

My invention relates to transmission gearing and controlling mechanism, particularly to gearing and controlling mechanism for vehicles, such as automobiles, the object of the invention being to produce transmission gearing and controlling mechanism therefor which is more direct, less complicated and at the same time more efficient than mechanism of this class heretofore used.

In automobiles, for instance, it is desired that the gearing mechanism be arranged to transmit several forward speeds, usually three, namely, slow speed, intermediate speed and full speed, and provision must also be made for reverse driving, usually of one speed which is comparatively slow. Heretofore to obtain such speed relations complicated gearing mechanism and controlling mechanism was necessary, the transmission mechanism involving complicated countershafting and gearing and in these systems also gears are normally out of mesh and must be brought into mesh usually while the machine is running, and as the gear teeth are usually very small and comparatively weak, the result was more or less stripping and mutilation of the gears which soon become useless. Complicated lever mechanism was also necessary in these prior systems to bring the various gears into action to obtain the various directions and speeds.

The main object of my invention is to provide for direct gearing connection between the engine shaft and the axle or shaft to be driven without the use of complicated gearing arrangement and countershafting. All the gears of my system are always in full mesh and their connection and service is accomplished by clutches having comparatively heavy clutch teeth for engaging into companion teeth carried by the driving gears. The size of the clutch teeth is not limited, as is the size of gearing teeth, and these clutch teeth can be made sufficiently heavy to withstand any sudden strains. The clutch teeth are also so arranged that their meshing is rapidly accomplished with practically no noise, and there can be only very little relative movement between the clutch collars and the clutch teeth on the gears before they are absolutely locked together. This arrangement practically eliminates any of the noises which are so prevalent in prior systems in which, when gears are to be brought together, there is great tendency for them to rasp by each other quite a while before the teeth finally take hold.

My invention also includes improved and simplified clutch controlling mechanism and I can, with one single lever, operate the clutch mechanisms to cause any speed of the machine. Various other improved features of construction and arrangement are included in my present system, which will be best understood when described by reference to the accompanying drawings, in which—

Figure 1 is a plan view of the transmission system of my invention associated with a shaft or axle to be driven, the top half of the inclosing casing being removed and part of the gearing mechanism being shown in section; Fig. 2 is a side view from the right, the casing, driving source and clutch controlling mechanism being removed; Fig. 3 is a side view from the left of the system, the casing and driving source being removed; Fig. 4 is a face view of a clutch collar; Fig. 5 is an edge view of a clutch collar; Fig. 6 is an enlarged view of the clutch selecting mechanism looking from plane 6—6 of Fig. 1; and Fig. 7 is a front view of the locking mechanism for the clutch selecting mechanism.

I have shown my invention applied to an automobile, the driving axle being in two parts, 1 and 2, terminating respectively in beveled gears 3 and 4 forming well-known differential mechanism. Beveled pinions 5 and 6 engage above the beveled gears 3 and 4 and pivot in the cylindrical wall 7 of the differential casing. The left wall 8 of the differential casing is shown integral with the cylindrical wall and has the hub 9 bearing on the axle part 1. The disk or cover 9' forms the right wall of the differential casing and has the hub 10 bearing on the axle part 2. Secured to the wall 8 by means of bolts 11 is the disk 12 carrying the beveled gear rings 13 and 14. The ring 13 has the annular tongue 15 extending upwardly therefrom, and the ring 14 has the annular tongue 16 extending inwardly, and when the parts are assembled the tongues 15 and 16 fit over each other and the bolts 17 pass therethrough and through the disk 12, thus forming a rigid main gear wheel.

Extending forwardly from the vehicle axle and preferably at right angles thereto is the engine or driving shaft 18 driven by the engine E. This shaft is journaled in the end bearings 19 and 20 and the middle bearing 21, all supported from the inclosing frame or casing 22 which casing entirely incloses all the gearing mechanism and also carries the bearings 23 and 24 in which are journaled the axle sections 1 and 2 respectively. In Fig. 1 only the lower half of the inclosing casing is shown, the upper half, however, being the same and fitting over and adapted to be bolted to the lower half. Loosely mounted on the driving shaft 18 are the beveled pinions 25 and 26 meshing, respectively, with the gear surfaces 13 and 14 of the main gear. These driving pinions are of novel construction and arrangement. The pinion 25 has the axial bore 27 which fits the driving shaft, the intermediary bore 28 of larger diameter and the outer bore or chamber 29 of still greater diameter, leaving the shoulders 30 and 31. At the rear end of the pinion is the extension 32 from which extend the clutch teeth 33 and 34, said teeth and extension 32 surrounding the chamber 35. The gear 26 has the axial bore 36 fitting the driving shaft and the bore or chamber 37 of larger diameter. The hub of the pinion at the foot of the teeth has the reduced section 38 of substantially the same diameter as the bore or chamber 29 in the pinion 25. The end 39 of the hub beyond the section 38 is still further reduced to a diameter substantially equal to the diameter of the bore or chamber 28 in the pinion 25. From the other end of the pinion 26 extend clutch teeth 40. When these driving gears are assembled on the shaft the ball bearing 41 engages over the shaft against the collar 42 thereon, and this ball bearing engages in the compartment 37 of the pinion 26. A ball bearing 43 encircles the part 39 of the pinion 26 and is disposed in the compartment 29 of the pinion 25 between the shoulder 31 and section 38, the part 39 engaging in the compartment 28 of the pinion 25 against the shoulder 30. In the compartment 35 of the pinion 25 is arranged the ball bearing 44 which has one member secured to the driving shaft, and thus the driving pinions are confined on the shaft between this rigid member of the ball bearing 44 and the collar 42. Thus these pinions are arranged very compactly and each has sufficient bearing surface to prevent displacement thereof during driving and the ball bearings reduce the friction to a minimum.

A section 45 of the driving shaft between the pinion 25 and the bearing 19 is squared for receiving the sliding clutch member 46, whose construction is best shown in Figs. 4 and 5. This clutch member consists of the two similar halves 47 and 48, which are held together by a ring 49 and set screw 50. The halves when assembled have the central square opening 51 which fits the squared sections on the shaft and from one face extend the teeth 52, 52, and 53, 53, the teeth 52 being shown opposite each other on a vertical line, and the teeth 53 being shown opposite each other on a horizontal line. The teeth are all the same width, which is equal to the width of the spaces 54 between the teeth. The teeth 52 also are slightly longer than the teeth 53. When the clutch member is to be mounted on the shaft its halves are applied from opposite sides thereto and the ring 49 then applied and the set screw 50 tightened.

In the position shown in Fig. 1 the clutch member 46 is out of engagement with the pinion 25, the long teeth 52 of the clutch member being shown opposite the short teeth 34 of the pinion 25, and the short teeth 53 of the clutch member are shown opposite the long teeth 33 of the pinion. If now the clutch member is moved toward the pinion the opposed teeth will engage and if the driving shaft is turning the long teeth will come into engagement with each other and the rotational movement of the shaft transmitted to the pinion. If pressure is maintained on the clutch member the teeth thereof will drop into the spaces between the teeth on the pinion 25, thus firmly locking the clutch member and pinion together. By having teeth of unequal length, upon movement of the clutch frame toward the pinion the clutch member can rotate through only a small angle before clutching takes place, that is, before the big teeth come into engagement. In other clutches the teeth are all of the same length and there is always a possibility of a great deal of relative rotation of the teeth past each other before they would finally grip, this being the main cause of noise. On the driving shaft between the collar 42 and bearing 21 is another squared section 55 for receiving the clutch member 56, which is similar to the clutch member 46. I provide a common clutch rod 57 for both the clutch members, this clutch rod having the fork 58 engaging in the slot 59 in the clutch member 46, and having the fork 60 engaging in the slot 61 of the clutch member 56. When the clutch rod is applied forwardly the clutch member 46 will connect the pinion 25 with the engine shaft and motion will be transmitted to the main gear by means of the gearing ring 13, while if the clutch rod is moved rearwardly the clutch member 56 will connect the pinion 26 to the engine shaft and rotation will be transmitted to the main driving gear through the gearing ring 14, and thus the vehicle can be given full speed.

Also loosely pivoted on the engine shaft are the beveled pinions 62 and 63 which are always in meshing relation with the beveled gear 64 which is pivoted on the stub shaft 65 extending from the right wall of the inclosing casing 22. These pinions 62 and 63 are of the same construction and shape as the pinion 25. A ball bearing 66 is interposed between the pinion 62 and the bearing 21, while a ball bearing 67 is interposed between the pinion 63 and the bearing 20. On the engine shaft between the pinions is the squared section 68 for receiving the clutch member 69 which is of similar construction as the other clutch members already described, except that this member 69 has teeth on both sides. An annular groove 70 is engaged by the fork 71 on the clutch rod 72. Extending from the beveled gear 64 is the hub 73 to which is secured the pinion 74. This pinion meshes with a gear 75 pivoted on the stub shaft 76 extending from the inclosing frame 22, and this gear meshes with the gear 77 loosely pivoted on the cylindrical section 7 of the differential casing, a ball bearing 78 being interposed between this gear and the disk 12 of the main gear. Teeth 79 extending from the hub of the gear 77 are adapted to be engaged by the teeth 80 extending from the clutch member 81. This clutch member also surrounds the differential casing but has only longitudinal movement thereon by virtue of keys 82. If this clutch member is moved into clutching engagement with the gear 77 and the engine shaft is rotated the gear 77 will be rotated through the gears 74 and 75 and the direction of rotation will depend upon which of the pinions 62 and 63 is connected with the engine shaft by the clutch member 69. This rotation of the gear 77 will be transmitted to the differential casing and to the main gear and axle. To control the clutching engagement of the clutch member 81 I provide lever mechanism. A fork 83 engages in the slot 84, as best shown in Fig. 2, and is secured to a shaft 85 suitably pivoted from the inclosing housing, as best shown in Fig. 1. Also secured to this shaft is an arm 86 whose end connects with one end of rod 87, whose other end connects with controlling mechanism which I shall presently describe. A spring 88 connects the arm 86 with the inclosing frame and tends to move the clutch member away from the gear 77.

I shall now describe the clutch selective and controlling mechanism, which can be operated by only one lever to select and to operate the various clutch rods to put any of the gears into service.

An inclosing box 89 is supported from the engine frame E. Secured to the front wall of this box is a plate 90 having the openings 91 and 92 therethrough. Extending through opening 91 and through a bearing hub 93 in the opposite wall of the box is a bar 94 which is connected with a clutch rod 57 by a universal coupling 95. Extending through the opening 92 and through the bearing hub 96 is the bar 97 which is connected with the clutch rod 72 by the universal coupling 98. In the plate 90 is a guide slot 99 in which is mounted the slide frame 100 having the depending tongue 101. Extending forwardly from the middle of this slide frame 100 are the tongues 102, 103, which form between them a groove 104. In the left wall of the box 89 is a bearing hub 105 on which pivots a shaft 106 terminating at its inner end in a pinion 107 and at its outer end in another pinion 108. The pinion 107 engages in the groove 104 and therefore any longitudinal movement of the shaft 106 will cause corresponding movement of the pinion 107 and of the slide frame 100. The upper part of the bar 94 is provided with teeth 109 and the bar 97 has the teeth 110 adapted to mesh with the teeth in the pinion 107 when said pinion is moved a sufficient distance to the left or right. The lower edge of the tongue 101 also engages in the teeth of the bars, but directly below the groove 104 the tongue 101 is cut away to leave the clear section 111, and thus when the pinion 107 is in mesh with the teeth on the bar 94, rotation of the pinion 107 will cause longitudinal movement of the bar 94 because the locking tongue 101 is moved out of the teeth 109. In the same way, if the gear 107 is moved to the right into mesh with the teeth on the bar 97, the clear space 111 will be over the bar 97, and upon rotation of the gear the bar will be given longitudinal movement. When the bar 94 is moved the clutch rod 57 will be moved to cause either of the clutch members 46 or 56 to be put into service, while if the shaft 97 is moved the clutch rod 72 will be moved to connect the clutch member 69 with either one of the beveled pinions 62, 63. Whenever these pinions, however, are put into service the gear 77 must be clutched to the axle and this I accomplish automatically upon movement of the selective gear 107 and the slide 100 to the right. An arm or post 112 extends from the right end of the slide 100 and a pin 113 pivoted in the hub 114 is adapted to be engaged by the post 112 upon movement to the right of the slide frame. Pivoted to the extension 115 is a bell crank lever 116 whose one arm pivots to the pin 113 and whose other arm connects with the clutch rod 87. Thus when the pinion 107 is moved to the right the post 112 will move the pin 113 outwardly to reach the bell crank lever and to move the clutch rod 87 to cause counterclockwise rotation of the shaft 85, whereupon the clutch fork 83 is swung to move the clutch member into engagement with the gear 77, and depending upon the direction of subsequent rotation of the pinion 107 the vehicle will be driven either forwardly or in reverse direction.

In Figs. 1 and 3 I have diagrammatically illustrated actuating mechanism for the selective mechanism controlled by a single lever 117. The lower end of this lever is secured to one end of the shaft 118 adapted to slide in stationary bearings 119 secured in any suitable manner to the framing of the machine. Extending from the other end of the shaft 118 is the arm 120 terminating in a gear segment or rack 121 which is preferably formed as shown in Fig. 3, comprising side plates 122, 123, between which extend gear pins 124, which engage the teeth of the pinion 108 which extends between the side plates 122, 123. Secured in any suitable way to the frame of the vehicle is a guide and locking plate 125. This plate has the two rectangular compartments 126, 127, separated by the tongues 128, 129, between whose ends the controlling lever 117 normally extends and is locked against rotation.

The operation of the transmission system is now plain. Normally the various clutch members are away from the driving pinions and gears. Suppose the engine is started and the engine shaft rotates only in one direction, as shown by the arrow in Fig. 1. If it is intended to start slowly the controlling lever 117 is first moved toward the right (referring to Fig. 1) into the compartment 127. This movement causes the shaft 118 and arm 120 to move toward the right and also the shaft 106 with the pinions 108 and 107 thereon, pinion 107 moving into mesh with the teeth on rod 97. The post 112 of the slide 100 engages the pin 113 to rotate the bell crank lever 116, the final result being the throwing of the clutch member 81 into engagement with the gear 77. The controlling lever 117 is then rotated forwardly, thereby causing rotation of the arm 120 carrying the gear segment and consequent rotation of the pinions 108, 107, the pinion 107 causing forward movement of the shaft 97 and the clutch member 72, the clutch member 69 being moved to connect the pinion 63 with the engine shaft. The resultant clockwise rotation of this pinion will be transmitted through the beveled gear 62, pinion 64 and gears 74 and 75 to the gear 77 which will rotate to cause forward travel of the vehicle. If it had been desired to start the vehicle in a reverse direction, the controlling lever, after having been moved toward the right, would have been rotated rearwardly to cause the clutch member 72 to be moved rearwardly to carry its clutch member into engagement with pinion 63 and the gear 77 would be rotated in reverse direction to cause the vehicle to move backwardly. If after having started in a forward direction it is desired to increase the speed, the controlling lever 117 is rotated back to its neutral plane and then moved toward the left into its central position. With this movement the pinion 107 is returned to its neutral position between the bars 94 and 97, and the post 112 of the slide 100 is moved to release the pin 113 to allow spring 88 to cause release of the clutch member 81 from the gear wheel 77 and the system is in its normal condition with all the clutches out of action. The controlling lever is then moved to the left into compartment 126, which causes the pinion 107 to come into mesh with the bar 94. The controlling lever is then rotated rearwardly with the result that the bar 94 and clutch rod 57 are moved rearwardly to carry the clutch member 56 into engagement with the pinion 26, and the clockwise rotation of the engine shaft is transmitted to the outer gearing surface 14 of the main gear to cause increased forward speed of the vehicle. If full speed is now desired, the controlling lever is rotated forwardly to the end of its stroke, the result being forward movement of the clutch member 57 to disengage the clutch member 56 and to connect the clutch member 46 with the pinion 25, whereupon the main gear is driven to cause maximum forward speed of the vehicle. The controlling lever could, of course, be moved to immediately throw in either the pinion 26 or the pinion 25, and usually on level roads the intermediary forward speed pinion 26 is thrown in from the first without first starting the vehicle with the slow speed forward pinion 63.

It will be noticed that when the controlling lever is in the compartment 126, it cannot be rotated to connect in either of the forward gears 25, 26, without first disconnecting one of the pinions 62 or 63 before the other is connected. It will also be seen that when the pinion 107 meshes with one of the clutch shafts the other clutch bar will be locked by virtue of the engagement of locking tongue 101 with the teeth on the bar. Also before the controlling lever can be moved from one compartment to the other it must pass through its neutral position, and therefore whichever clutch bar was at first engaged will be moved to restore its clutch member to the neutral position before the pinion 107 can be brought into engagement with the next clutch bar. Also, as before stated, the clutch member 81 will be held from the gear 77 except when the pinion 107 is in engagement with the clutch bar 97, during which time operation of the gear 77 is desired. With this arrangement it is absolutely impossible to connect in two driving pinions at the same time, it being absolutely necessary that before any clutch member can engage a driving pinion it must first be disengaged from the other pinion. Normally, the controlling lever 117 is in position between the tongues 128, 129, and the pinion 107 is midway between the clutch bars, which are locked against movement by the locking tongue 101 of the slide 100, the clutch members 46, 56 and 69 being all in their neutral position out of engagement with any driving pinions. The clutch member 81 is also normally held out of engagement from the gear 77 by the spring 88.

I thus provide a transmission system for automobiles or other vehicles which can be absolutely controlled with one lever and in which all the clutch parts are locked against movement except at the time during which they are to be acted. I am enabled to obtain three speeds ahead and one reverse without the use of any countershafting, and the gears of my system are never out of mesh, there being consequently no danger whatever that the teeth thereon will be stripped as is the case where it is necessary that gears be brought into and out of meshing relation while they are rotating. The arrangement of the driving pinions on the single driving shaft is very compact and simple. The driving pinions 25, 62 and 63 are identical and interchangeable, which means a great saving in repairs. By adjusting the ratio between the gear 75 and pinion 74 the slow speed forward and reverse can be adjusted.

I do not wish to be limited to the precise construction and arrangement herein shown and described, as changes may readily be made without departing from the scope of my invention.

What I claim as new and desire to secure by Letters Patent:

1. In combination, an axle or shaft to be driven, a driving shaft at an angle to the axle, a main gear connected to the axle, a set of driving gears normally loosely mounted on the driving shaft and always in mesh with the main gear, a second set of driving gears normally loosely mounted on the driving shaft, a gear common to the gears of the second set and always in mesh therewith, a gear wheel concentric with the axle but normally disconnected therefrom, a gearing train connecting said gear wheel with the gear connected to the gears of the second set, clutch mechanism for connecting any of said driving gears with the driving shaft to rotate therewith, and additional clutch means for connecting the gear wheel to the axle.

2. In combination, an axle to be driven, a driving shaft at an angle with the axle, a main gear secured to the axle, a set of driving pinions normally loosely journaled on the driving shaft but always in mesh with the main gear, a second set of driving pinions normally loosely journaled on the driving shaft, a common gear for the pinions of the second set always in mesh therewith, a gear wheel normally loosely mounted about the axle, a gearing train connecting the gear wheel with the common gear for the second set, clutch collars for the driving pinions slidably mounted on the driving shaft but constructed to rotate therewith, means for independently moving any one of said clutch collars into engagement with the corresponding driving pinion, and an additional clutch means for connecting the gear wheel with the axle.

3. In combination, an axle to be driven, a driving shaft at an angle with the axle, a main gear secured to the axle, a set of driving pinions normally loosely mounted on the driving shaft but always in mesh with the main gear, a second set of driving pinions normally loosely mounted on the driving shaft, a common gear for the pinions of the second set always in mesh therewith, a gear wheel normally loosely journaled about the axle, a gearing train connecting the gear wheel with the common gear for the second set, clutch members for each set of driving pinions slidably mounted on the driving shaft and to rotate therewith, an additional clutch member always rotating with the axle and adapted when actuated to connect the gear wheel with the axle, means for moving the clutch members of the first set of driving pinions to connect either one of said pinions to the driving shaft to rotate therewith and to rotate the main gear on the axle, and means for causing movement of the clutch member for the second set of driving pinions and the clutch member for the gear wheel on the axle to connect said gear wheel with the axle and either one of the gears of the second set with the driving shaft.

4. In combination, an axle to be driven, a driving shaft at an angle with the axle, a main gear secured to the axle, a set of pinions on said driving shaft normally loosely mounted thereon and meshing with the main gear, a second set of driving pinions normally loosely mounted on the driving shaft, a common gear for the pinions of the second set always in mesh therewith, a gear wheel normally idly mounted concentric with the axle, a gearing train connecting said gear wheel with the common gear for the second set, clutch mechanism associated with each of the driving pinions, additional clutch mechanism associated with the gear wheel, selective mechanism associated with the clutch mechanisms, and a single operating lever for causing selection of the clutch mechanisms and operation thereof.

5. In combination, an axle to be driven, a driving shaft at an angle with the axle and rotating always in one direction, a set of driving pinions normally idly mounted on the driving shaft, a main gear on the axle always in meshing engagement with the driving pinions, clutch mechanisms for connecting either one of said pinions to the driving shaft to rotate therewith, a secondary gear wheel normally idly mounted on the axle. a second set of driving pinions normally idly mounted on the driving shaft, a gearing train connecting both pinions of the second set with the secondary gear wheel and always in meshing relation with the pinions of the second set and with the secondary gear wheel, clutch mechanism for the second set for connecting either pinion thereof with the driving shaft, clutch mechanism for connecting the secondary gear wheel with the axle, and means for causing actuation of the clutch mechanism for the second set of driving pinions and the clutch mechanism for the secondary gear wheel.

6. In a system of transmission gearing, the combination with an axle to be driven, of a main gear mounted thereon, a driving shaft, a high speed forward and an intermediary speed forward driving pinion normally idly mounted on said driving shaft and always in mesh with the main gear, a slow speed forward driving pinion normally idly mounted on the driving shaft, a reverse driving pinion normally idly mounted on the driving shaft, a gearing train connected with both the forward slow speed and reverse pinions for transmitting the movements thereof to the axle, the gears of said train being always in mesh, and clutch mechanism for independently connecting any one of the driving gears with the driving shaft to rotate therewith to cause corresponding rotation of the axle.

7. In a system of transmission gearing, the combination of an axle to be driven, a main gear mounted on said axle, a driving shaft, a plurality of driving pinions mounted on said driving shaft, a secondary gear normally idly mounted on the axle and connected with two of the driving pinions on the driving shaft, the other driving pinions on the driving shaft being in engagement with the main gear, and clutch mechanism for independently connecting any one of said driving pinions in driving relation with the driving shaft.

8. In a system of transmission gearing, the combination of an axle to be driven, a main gear secured to the axle, said main gear having a plurality of gearing surfaces of different diameter, a driving shaft, driving pinions on said driving shaft connected with the corresponding gearing surfaces on said main gear, a secondary gear normally idly mounted on the axle, another driving pinion on said driving shaft always connected with said secondary gear, clutching mechanism for connecting any one of the driving pinions with the driving shaft, and clutching mechanism for connecting said secondary gear with the axle.

9. In a system of transmission gearing, the combination of an axle to be driven, a main gear secured to said axle, a driving shaft at right angles to the axle, driving pinions normally idly mounted on said driving shaft and engaging the main gear, a secondary gear normally idly mounted on the axle, another driving pinion on the driving shaft connected with the secondary gear, clutch mechanism for independently connecting any one of said driving pinions in driving relation with the driving shaft, and additional clutch mechanism for connecting said secondary gear with the axle.

10. In a system of transmission gearing, the combination of an axle to be driven, of a main gear secured thereto and having gear surfaces, a driving shaft at right angles to the axle, a set of driving pinions mounted on the driving shaft and meshing with the gear surfaces on the main gear, a secondary gear normally idly mounted about the axle, another driving pinion mounted on the driving shaft and always connected with the secondary gear, clutching mechanism for independently connecting any one of the pinions of the set with the driving shaft, and clutching means for connecting the other driving pinion with the driving shaft and for connecting the secondary gear with the axle.

11. In a system of transmission gearing, the combination of an axle to be driven, a main gear mounted on the axle, a driving shaft at an angle with the axle, a set of driving pinions mounted on the driving shaft and engaging the main gear, a set of forward and reverse driving pinions on said driving shaft, a secondary gear mounted about the axle, gearing connecting the forward and reverse pinions with the secondary gear and always in mesh therewith, clutch mechanism for independently connecting any one of the pinions of the first set with the driving shaft, clutch mechanism for connecting the secondary gear with the axle, and clutch mechanism for connecting either the forward or reverse driving pinions with the driving shaft.

12. In a system of transmission gearing, the combination of an axle to be driven, a main gear mounted on said axle, a driving shaft at right angles to the axle, said main gear having a plurality of gearing surfaces, driving pinions on said driving shaft, each engaging one of the gearing surfaces on the main gear, a secondary gear mounted about the axle, forward and reverse driving pinions on said driving shaft, a gearing train always meshing with said forward and reverse driving pinions and with the secondary gear, said driving shaft being rotated in one direction and normally disconnected from the driving gears thereon, clutch mechanism for independently connecting said shaft with any one of the driving pinions thereon, and additional clutch mechanism for connecting the secondary gear with the axle.

13. In a system of transmission gearing, the combination of an axle to be driven, a single driving shaft at right angles to the axle and rotating always in one direction, forward and reverse driving pinions on the driving shaft at one side of the axle, gears connecting said driving pinions with the axle, and clutch mechanism for independently connecting the driving pinions with the driving shaft whereby forward or reverse direction of rotation may be transmitted to the axle.

14. In a transmission system, the combination of an axle to be driven, a single driving shaft at right angles to the axle and driven only in one direction, driving pinions on said driving shaft at one side of the axle, gearing always in meshing engagement with said driving pinions for connecting said pinions with the axle, clutch mechanism for each driving pinion for connecting the driving pinion with the driving shaft, selective mechanism for selecting one of the clutch mechanisms to be actuated and for actuating the selected clutch mechanism, and a single controlling lever for operating the selective mechanism.

15. In a transmission system, the combination of an axle to be driven, a driving shaft at right angles to the axle and rotating only in one direction, forward and reverse driving pinions on said driving shaft at one side of the axle, gearing mechanism connecting the pinions with the axle, clutch means for each pinion for independently connecting said pinion with the driving shaft to rotate therewith, selective mechanism adapted to move into operative relation with any one of the clutch means and to be moved to cause operation of the selected clutch means to connect the corresponding pinion to rotate with the driving shaft, and a single controlling lever for causing all movements of the selective mechanism.

16. In a transmission system, the combination of an axle to be driven, a main gear mounted on the axle, a driving shaft at right angles to the axle, a set of pinions on said driving shaft meshing with the main gear, a forward and a reverse beveled pinion, both mounted on the driving shaft, a beveled gear engaging both forward and reverse beveled pinions, a secondary gear mounted concentric with the axle and always connected with the beveled gear, the pinions on the driving shaft being normally disconnected therefrom and said secondary gear being normally disconnected from the axle, clutch mechanism for independently connecting any one of the pinions with the driving shaft to rotate therewith, and additional clutch mechanism for connecting the secondary gear with the axle.

17. In combination, two sections of an axle to be driven, a differential casing pivoted on the axle parts, differential mechanism contained within the casing for connecting the axle parts, a main gear mounted to rotate with the casing, a driving shaft at right angles to the axle and rotating in one direction, forward driving pinions on said driving shaft engaging the main gear, a secondary gear rotatably mounted on the differential casing, a reverse pinion on the driving shaft always connected with the secondary gear, means for independently connecting any one of the pinions with the driving shaft to rotate therewith, and means for connecting the secondary gear to the differential casing and thereby with the axle.

18. In a transmission system, an axle to be driven comprising two parts, differential mechanism connecting together the two parts, a casing mounted on the axle parts and supporting some of the differential mechanism, a main gear secured to the differential casing concentric with the axle, a driving shaft at right angles to the axle and rotating only in one direction, forward driving pinions on the driving shaft meshing with the main gear, a secondary gear mounted on the differential casing concentric with the axle, a slow speed forward pinion and a reserve pinion on the driving shaft, a beveled gear meshing with both the slow speed and the reverse pinions, gearing always meshing with the beveled gear and with the secondary gear, clutches for independently connecting any one of the driving pinions with the driving shaft to rotate therewith, and a clutch for connecting the secondary gear with the differential casing and thus with the axle.

19. In a transmission system, an axle to be driven comprising two parts, differential mechanism connecting together the two parts, a casing mounted on the axle parts and supporting some of the differential mechanism, a main gear secured to the differential casing concentric with the axle, a driving shaft at right angles to the axle and rotating only in one direction; forward driving pinions on the driving shaft meshing with the main gear, a secondary gear mounted on the differential casing concentric with the axle, a slow speed forward pinion and a reverse pinion on the driving shaft, a beveled gear meshing with both the slow speed and the reverse pinions, gearing always meshing with the beveled gear and with the secondary gear, clutches for independently connecting any one of the driving pinions with the driving shaft to rotate therewith, a clutch for connecting the secondary gear with the differential casing and thus with the axle, clutch rods for the clutches, selective mechanism for selecting the clutch rods and adapted to be actuated to move the selected clutch rod to carry its clutch member to connect the corresponding clutch, and a single controlling lever for controlling the operation of the selective mechanism.

20. In a transmission system, the combination of an axle to be driven, a main driving gear on the axle, a driving shaft at right angles to the axle, forward driving pinions on the driving shaft engaging with the main gear, a reverse driving pinion on the driving shaft, a secondary gear mounted concentric with the axle, gears for connecting the reverse pinion with the secondary gear whereby the ratio of transmission may be varied, means for clutching any one of the driving pinions to the driving shaft, and means for clutching the secondary gear to the axle.

21. In a transmission system, the combination of an axle to be driven, a main gear on the axle, a driving shaft at an angle to the axle and rotating only in one direction, a forward driving pinion on the driving shaft engaging the main gear, a reverse pinion on the driving shaft, a secondary gear mounted concentric with the axle, gears, pivots for receiving said gears for connecting the reverse pinion with the secondary gear, means for clutching either driving pinion to the driving shaft, and means for clutching the secondary gear to the axle.

22. In a transmission system, the combination of an axle to be driven, a main gear on the axle, a driving shaft at an angle with the axle and rotating always in one direction, a high speed forward driving pinion on said driving shaft meshing with the main gear, a slow speed forward driving pinion on the driving shaft, a reverse driving pinion on the driving shaft, a secondary gear mounted concentric with the axle, gearing connecting said secondary gear with both the slow speed and reverse pinions, means for independently clutching any one of the driving pinions to the driving shaft, and means for clutching the secondary gear to the axle.

23. In a transmission system, the combination of an axle to be driven, a main gear on the axle, a driving shaft at an angle with the axle and rotating always in one direction, a high speed forward driving pinion on said driving shaft meshing with the main gear, a slow speed forward driving pinion on the driving shaft, a reverse driving pinion on the driving shaft, a secondary gear mounted concentric with the axle, gearing connecting said secondary gear with both the slow speed and reverse pinions, means for independently clutching any one of the driving pinions to the driving shaft, and means for clutching the secondary gear to the axle, said pinions on the driving shaft being interchangeable.

In testimony whereof, I hereunto subscribe my name this 10th day of January A. D., 1907.

JOHN SCHLIG.

Witnesses:
CHARLES J. SCHMIDT,
FRED W. KOEHN.